No. 702,904. Patented June 24, 1902.
T. ABRAHAM.
BOX AND COVER.
(Application filed Dec. 21, 1901.)
(No Model.) 2 Sheets—Sheet 2.

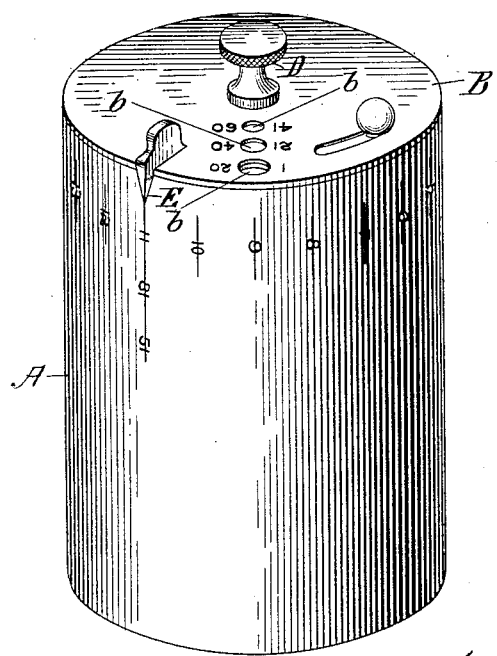

WITNESSES:
Ellen B. Tomlinson.
Jeremiah Toomey.

INVENTOR:
Thomas Abraham
by Alex. P. Browne,
attorney.

UNITED STATES PATENT OFFICE.

THOMAS ABRAHAM, OF HOPEDALE, MASSACHUSETTS, ASSIGNOR TO THE MORSE TWIST DRILL AND MACHINE COMPANY, OF NEW BEDFORD, MASSACHUSETTS.

BOX AND COVER.

SPECIFICATION forming part of Letters Patent No. 702,904, dated June 24, 1902.

Application filed December 21, 1901. Serial No. 86,728. (No model.)

*To all whom it may concern:*

Be it known that I, THOMAS ABRAHAM, a citizen of Great Britain, (but having declared my intention of becoming a citizen of the United States,) residing at Hopedale, in the county of Worcester and State of Massachusetts, have invented an Improved Box and Cover, of which the following is a specification.

My invention relates to that class of devices used for the reception of articles of uniform shape, and particularly such articles as twist-drills; and it has for its object the improvement of such devices, as will be hereinafter more fully set forth.

Figure 3:
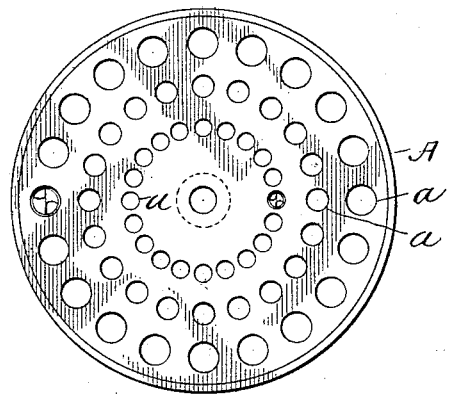
Figure 4:
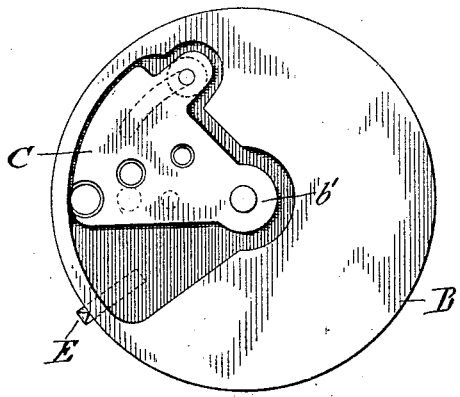
Figure 5:
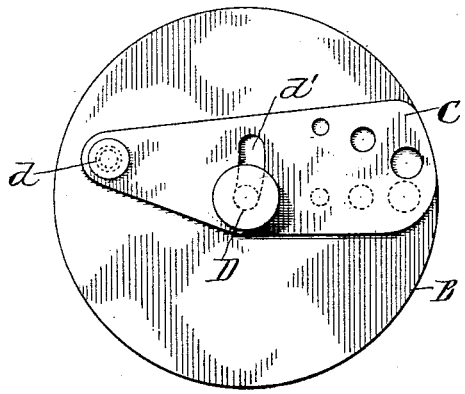

In the drawings, Figure 1 represents a view in perspective of my improved device in the form now best known to me; Fig. 2, a vertical central section thereof, and Fig. 3 a top plan view of the box with the cover removed. Fig. 4 represents a bottom plan view of the top or cover shown in Fig. 1. Fig. 5 shows a top plan view of a modification of the cover, the principal component parts thereof being shown in like manner at Figs. 6 and 7.

The box shown in the drawings is especially adapted to contain twist-drills or other tools of varying sizes which it is desired to keep in an orderly arrangement, each size of tool in its own compartment. To this end I divide the interior of the box A into a plurality of compartments $a$, disposed circularly and concentrically with reference to the center of the box, which is preferably cylindrical in form.

The box-cover B is provided with a plurality of apertures $b$, (three being the number represented,) equal in number to the number of circles of compartments represented in the box-body. These apertures are so disposed with respect to each other and to the rows of circles of compartments as to be capable of being brought into alinement therewith.

In the preferred form of cover shown in Figs. 1 and 4 the cover B, in which the apertures $b$ are formed, is pivoted centrally upon the top of the box, as shown at $b'$, so as to be capable of circular motion, whereby each of the apertures may be brought over and made to register with any one of its corresponding circular row of compartments.

In order that either of the apertures may be opened to communicate with the compartments of its row or circle while the other apertures remain closed, I provide a supplemental cover-plate C, which is pivoted upon the main cover and which also contains three apertures so disposed that when any one is in line with the corresponding aperture of the main cover-plate the other two are out of alinement with their apertures. This supplemental cover-plate may be disposed, as shown in Fig. 4, upon the under side of the main cover and be pivotally connected thereto by the same means—viz., by the screw D—by which the cover is attached to the box.

Figure 6:
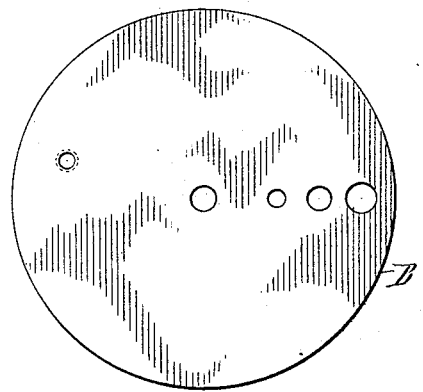
Figure 7:
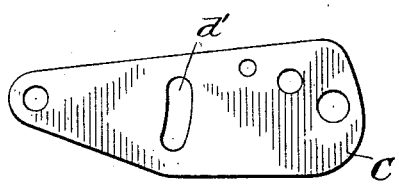

In the modification shown in Figs. 5, 6, and 7 the supplemental cover-plate C instead of being put upon the under side is put upon the upper side of the main cover and instead of being pivoted upon the pivot D of the main cover is provided with an independent pivot $d$ and is slotted or otherwise formed, as shown at $d'$, to allow it to be moved past the pivot D of the main cover.

It will be understood that it is desirable after moving the cover, so that one of its apertures shall register with a given compartment, to lock the parts in position, and for this purpose the pivot D may be made in the form of a set-screw or thumb-screw, as shown.

It is found convenient in practice to number the compartments consecutively and to place the numbers showing the compartments in each row in juxtaposition with the aperture controlling that row, as shown in Fig. 1. It is further found convenient to mark upon the body of the box numbers corresponding to the numbers of the compartments, and to arrange these numbers in rows corresponding to the rows of apertures. If then the movable cover of the box be provided with an index E, by bringing this index into line with a number on the body of the box the apertures therein will be found to be in alinement with the compartments indicated.

I claim—

1. A box having a plurality of compartments disposed concentrically in a plurality of circular rows, a cover having apertures corresponding in number to the number of rows, and each aperture located over one of the said rows, means for causing each of said apertures to register with any of the compartments in its corresponding row, and means for opening and closing said apertures independently.

2. The combination of a box having a series of compartments open at one end, an apertured cover rotatably mounted upon the box and movable across the open ends of the compartments therein, and a slide adapted to be adjusted to open or close the compartments exposed by the cover.

3. The combination of a box having a series of compartments open at one end, a rotatable, apertured, cover movable across the open ends of the compartments in the box, and a slide arranged between the box and the cover and moving with the latter, said slide being independently adjustable to open and close the apertures in the cover.

4. The combination of a box having a series of compartments arranged in concentric rows, a rotatable cover having a plurality of apertures, each located over one of said rows, and a slide adapted to be adjusted to establish communication between either of the apertures in the cover and the alined compartment of the box.

5. The combination of a box having a series of compartments arranged in concentric rows, a rotatable cover having a plurality of apertures arranged in the same radial line and corresponding in number and arrangement to the rows of compartments, and a pivotally-mounted slide having a plurality of apertures arranged on different radial lines and corresponding in number to the apertures in the cover, whereby said slide is adapted to place either of the apertures in the cover in communication with the alined compartment in the box without uncovering the other compartments that are in alinement with apertures in the cover.

6. The combination of a box having a series of compartments arranged in concentric rows, a rotatable cover having a plurality of apertures corresponding in number and arrangement to the rows of compartments, and having an index indicating and distinguishing the contents of compartments in each row from the contents of the other rows in the box, and a pointer carried by the cover and movable thereby over an index on the box indicating the contents of each of the several compartments in each row.

7. The combination of a cylindrical box having a series of longitudinally-extending compartments open at one end, and arranged in concentric rows, a cover rotatable across the open ends of said compartments and having a plurality of apertures corresponding in number and arrangement to the rows of compartments in the box, and an index adjacent said apertures, a pointer movable with the cover into alinement with the division of an index on the body of the box, each corresponding to a radial line of compartments, and a slide adapted to be adjusted with relation to the index on the cover to open or close either of the apertures in the cover.

In testimony whereof I have hereunto subscribed my name this 10th day of December, 1901.

THOMAS ABRAHAM.

Witnesses:
FRANK H. CARTER,
WILLIAM E. MCCLEARY.